United States Patent
Ehrlich

(10) Patent No.: US 9,027,750 B1
(45) Date of Patent: May 12, 2015

(54) PHONE SUPPORT DEVICE

(71) Applicant: Robert Ehrlich, Orange, TX (US)

(72) Inventor: Robert Ehrlich, Orange, TX (US)

( * ) Notice: Subject to any disclaimer, the term of this patent is extended or adjusted under 35 U.S.C. 154(b) by 0 days.

(21) Appl. No.: 14/036,061

(22) Filed: Sep. 25, 2013

(51) Int. Cl.
*B65D 85/00* (2006.01)
*B65D 1/34* (2006.01)

(52) U.S. Cl.
CPC ........................................ *B65D 1/34* (2013.01)

(58) Field of Classification Search
USPC .............. 206/45.24, 305, 320, 762, 764, 765, 206/557, 559, 560, 565; 5/495, 496, 504.1; 224/191, 269, 271, 666, 667, 930; 361/679.01; 455/575.1, 575.6, 575.8
See application file for complete search history.

(56) References Cited

U.S. PATENT DOCUMENTS

| | | | |
|---|---|---|---|
| 4,419,794 A * | 12/1983 | Horton et al. .................. | 224/272 |
| 4,862,541 A * | 9/1989 | Hutton et al. ..................... | 5/496 |
| 5,360,108 A * | 11/1994 | Alagia ........................... | 206/320 |
| 5,363,969 A * | 11/1994 | Shen ........................... | 206/45.24 |
| 5,758,972 A | 6/1998 | Mack et al. | |
| 8,032,959 B2 | 10/2011 | Rowson et al. | |
| D668,247 S | 10/2012 | Kim et al. | |
| 8,276,224 B1 | 10/2012 | von Yurt et al. | |
| 8,356,736 B2 | 1/2013 | Musgrave | |
| 2007/0261978 A1* | 11/2007 | Sanderson .................... | 206/320 |
| 2010/0162486 A1 | 7/2010 | Joyce | |
| 2010/0275374 A1* | 11/2010 | Hipp ................................ | 5/496 |
| 2011/0011906 A1* | 1/2011 | Musgrave ..................... | 224/269 |
| 2012/0024741 A1* | 2/2012 | Beatty et al. .................. | 206/521 |
| 2012/0118770 A1* | 5/2012 | Valls et al. .................... | 206/320 |
| 2012/0211622 A1 | 8/2012 | Keehfus | |

* cited by examiner

Primary Examiner — Luan K Bui

(57) ABSTRACT

A phone support device holds and supports a phone on or adjacent to a bed. The device includes a tray having a panel and a perimeter wall coupled to and extending upwardly from a perimeter edge of the panel defining a receptacle such that the tray is configured for receiving a phone in the tray. A knob is coupled to and extends from a bottom surface of the panel. A clip having a pair of spaced arms selectively engageable to the knob wherein the clip is secures the tray to a sheet by positioning the sheet between the knob and the clip when the clip is engaged to the knob.

9 Claims, 6 Drawing Sheets

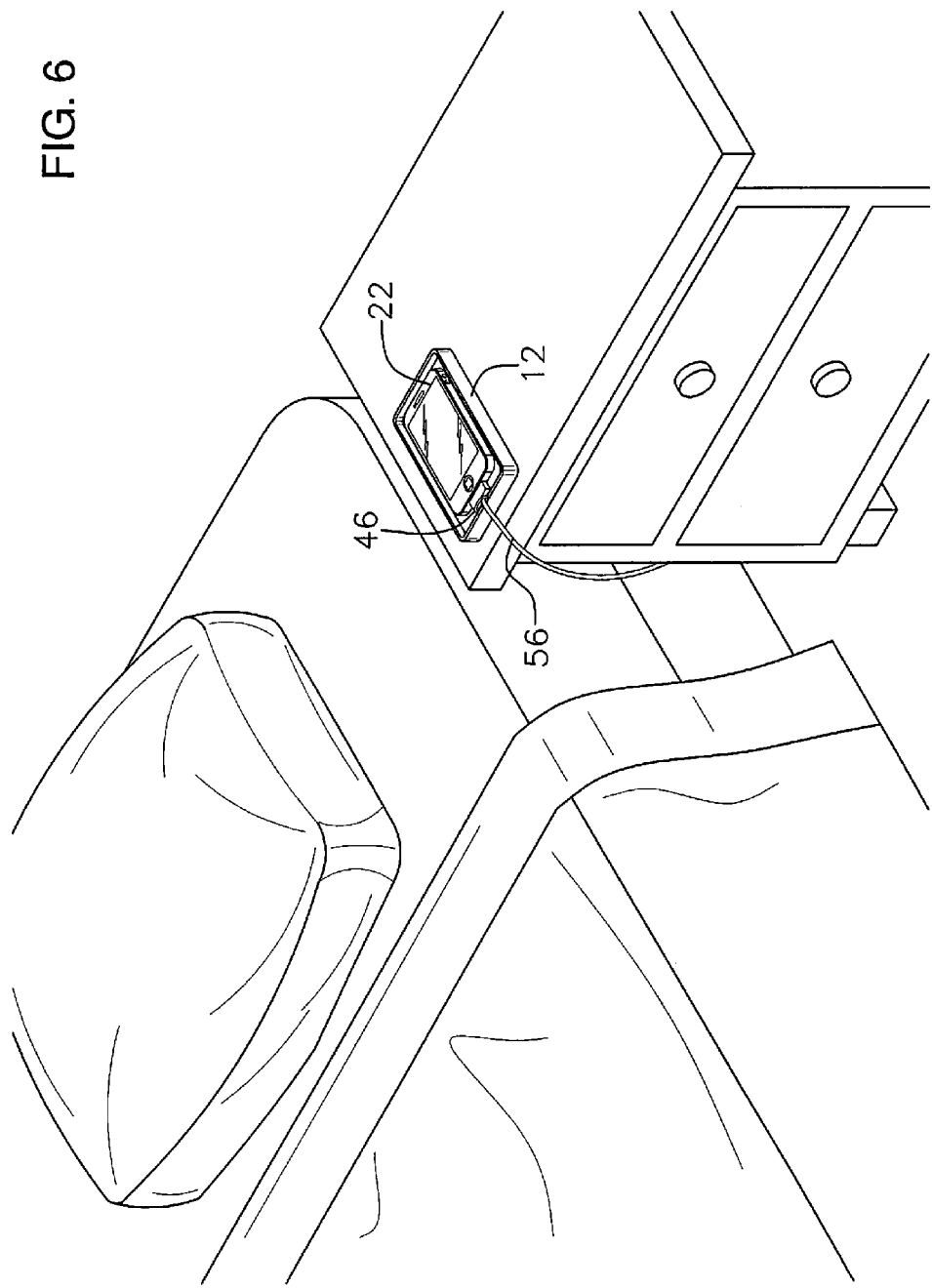

PHONE SUPPORT DEVICE

BACKGROUND OF THE DISCLOSURE

Field of the Disclosure

The disclosure relates to support devices and more particularly pertains to a new support device for holding and supporting a phone on or adjacent to a bed.

SUMMARY OF THE DISCLOSURE

An embodiment of the disclosure meets the needs presented above by generally comprising a tray having a panel and a perimeter wall coupled to and extending upwardly from a perimeter edge of the panel defining a receptacle such that the tray is configured for receiving a phone in the tray. A knob is coupled to and extends from a bottom surface of the panel. A clip having a pair of spaced arms selectively engageable to the knob wherein the clip is secures the tray to a sheet by positioning the sheet between the knob and the clip when the clip is engaged to the knob.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein:

FIG. 6 is a top front side perspective view of an embodiment of the disclosure in use.

DESCRIPTION OF THE PREFERRED EMBODIMENT

Figure 1:
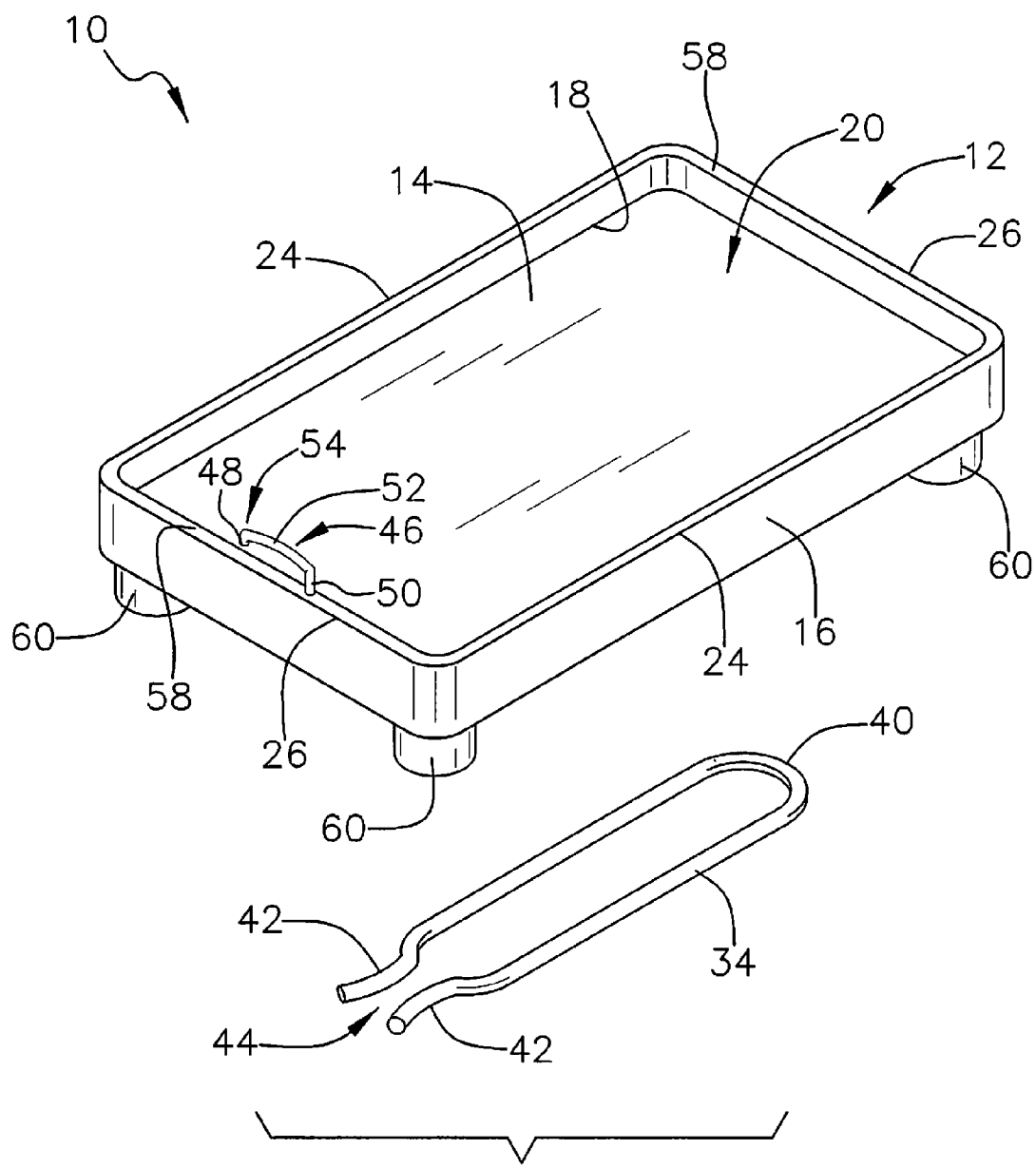
FIG. 1 is a top front side perspective view of a phone support device according to an embodiment of the disclosure.
Figure 2:
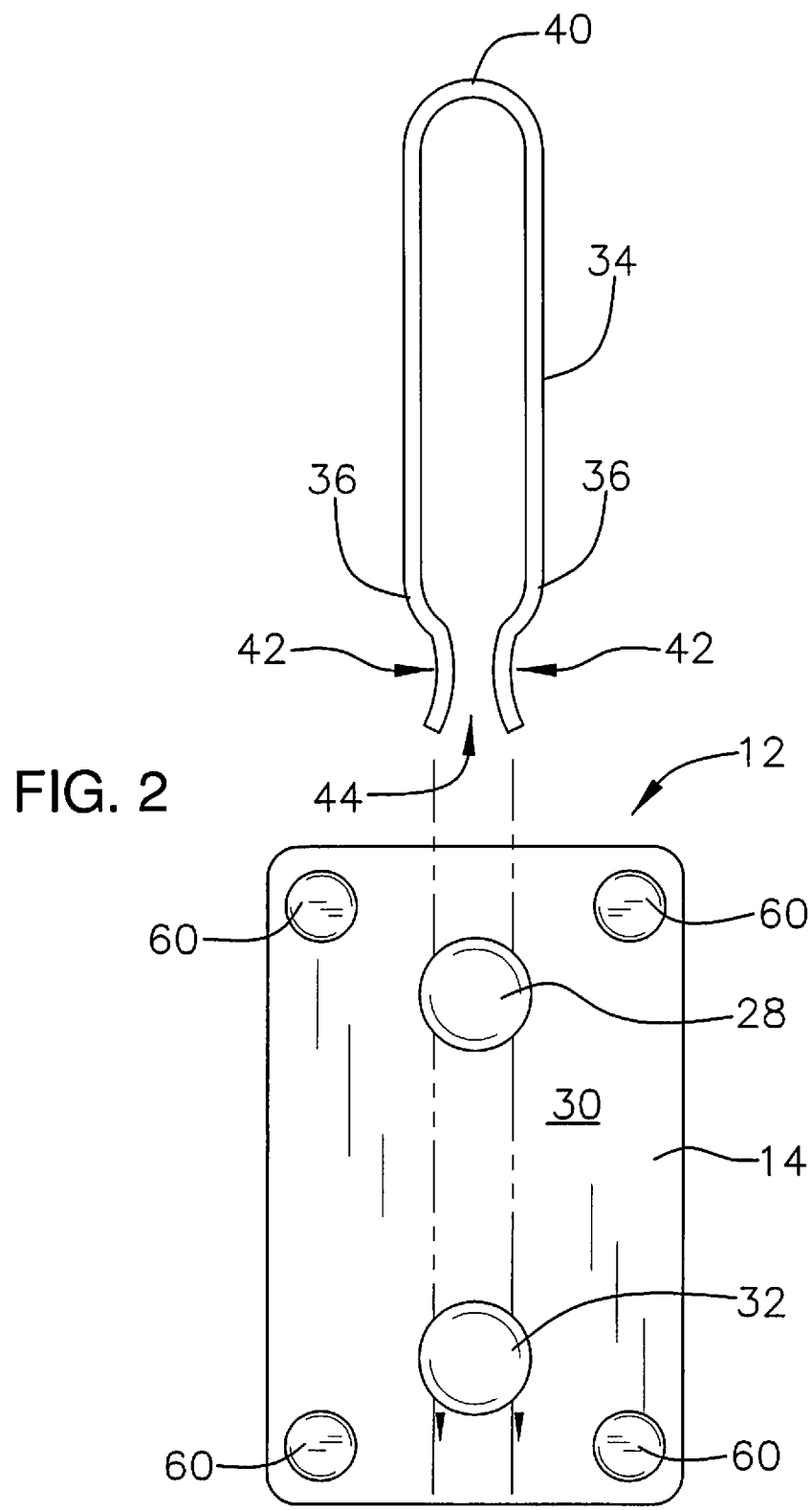
FIG. 2 is a partially exploded bottom view of an embodiment of the disclosure.
Figure 3:
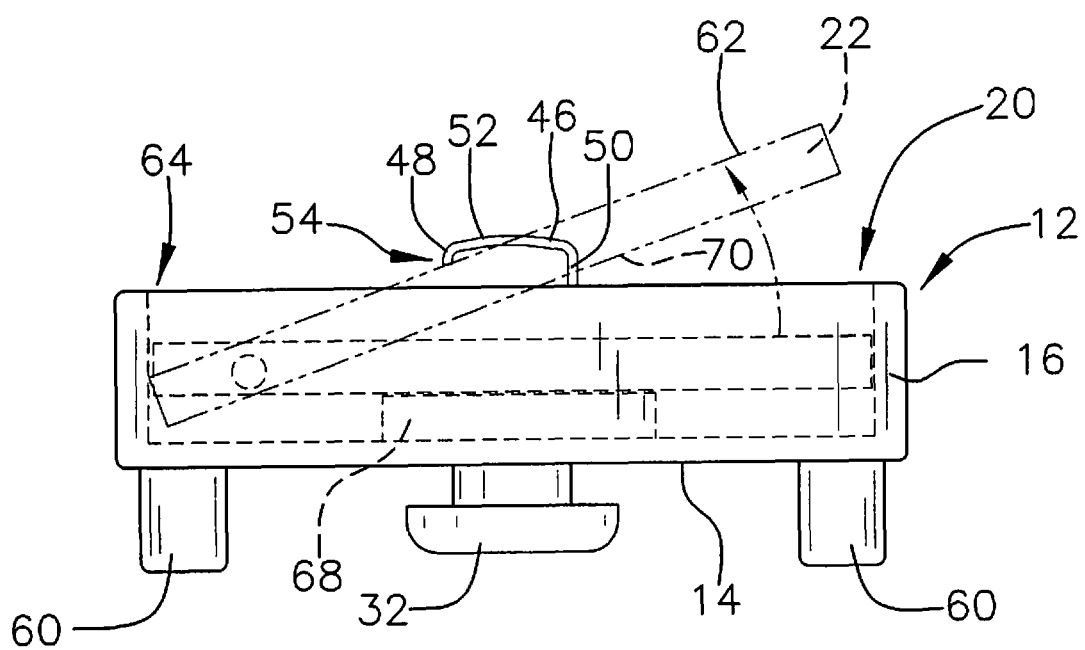
FIG. 3 is a front view of an embodiment of the disclosure.
Figure 4:
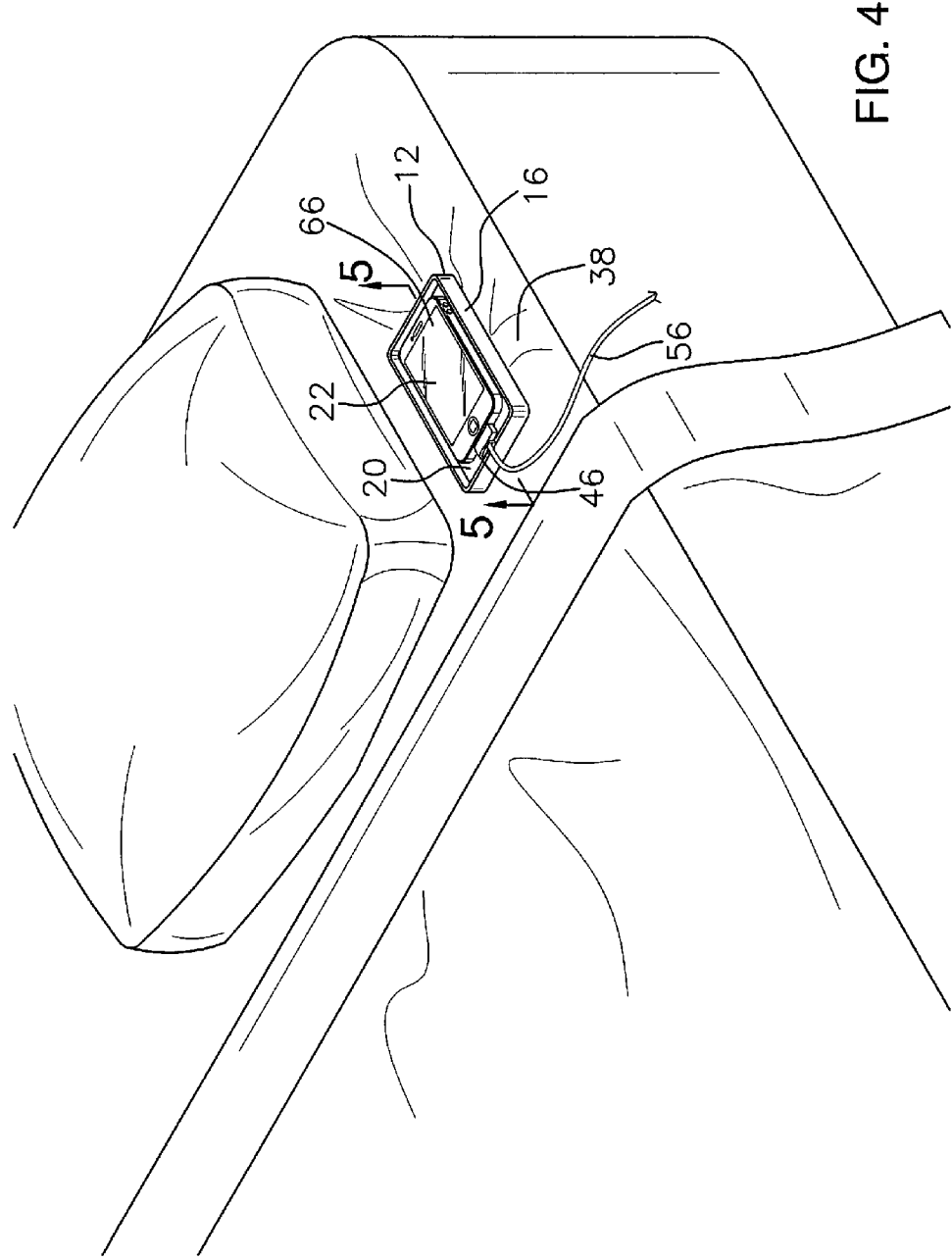
FIG. 4 is a top front side perspective view of an embodiment of the disclosure in use.
Figure 5:
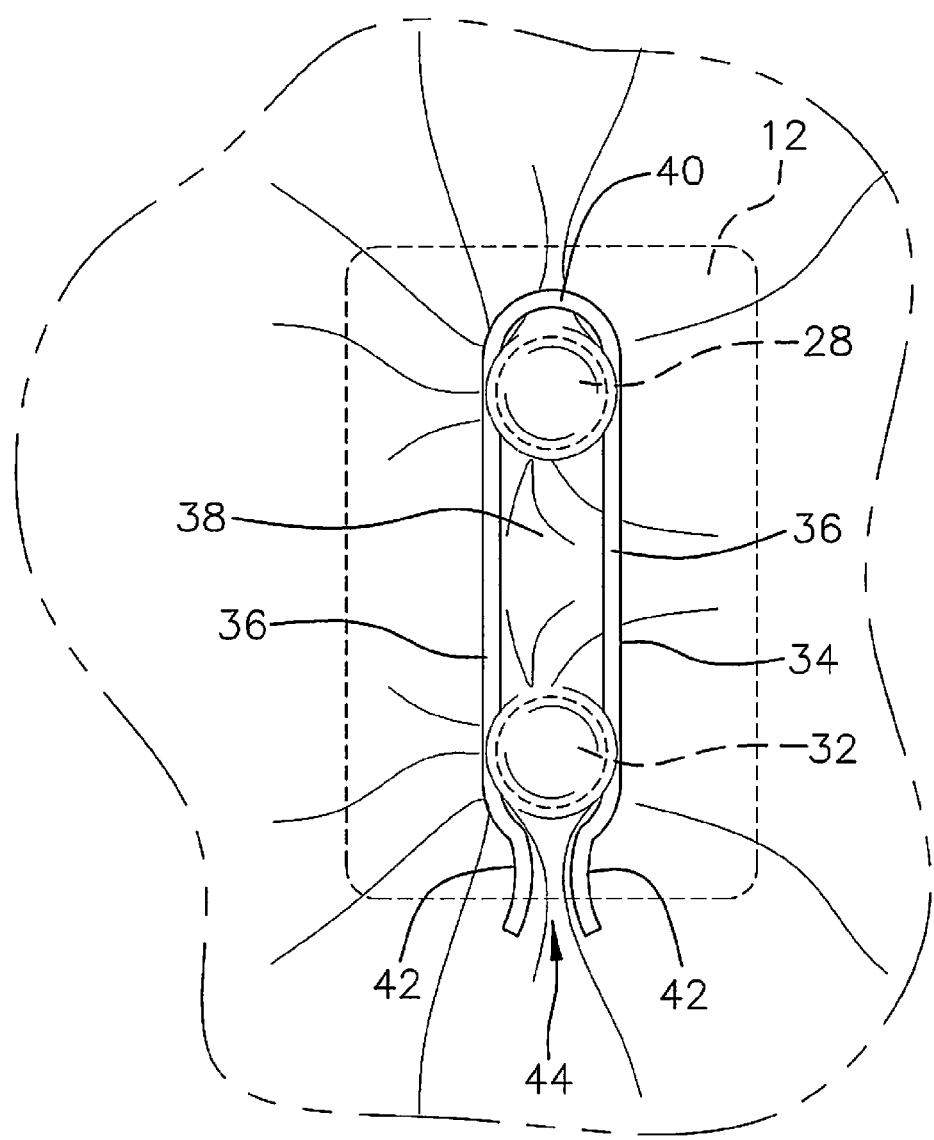
FIG. 5 is a bottom view of an embodiment of the disclosure in use.

With reference now to the drawings, and in particular to FIGS. 1 through 6 thereof, a new support device embodying the principles and concepts of an embodiment of the disclosure and generally designated by the reference numeral 10 will be described.

As best illustrated in FIGS. 1 through 6, the phone support device 10 generally comprises a tray 12 having a panel 14 and a perimeter wall 16 coupled to and extending upwardly from a perimeter edge 18 of the panel 14 defining a receptacle 20 such that the tray 12 is configured for receiving a phone 22 in the tray 12. The perimeter wall 16 may be rectangular having a pair of longitudinal sides 24 and a pair of opposed end sides 26 extending between the longitudinal sides 24. A first knob 28 is coupled to and extends from a bottom surface 30 of the panel 14. A second knob 32 is coupled to and extends from the bottom surface 30 of the panel 14. The second knob 32 is positioned in spaced relationship to the first knob 28. A clip 34 has a pair of spaced arms 36. The spaced arms 36 are selectively engageable to the first knob 28 wherein the clip 34 is configured for securing the tray 12 to a sheet 38 by positioning the sheet 38 between the first knob 28 and the clip 34 when the clip 34 is engaged to the first knob 28. The clip 34 may be elongated to engage both the first knob 28 and the second knob 32. The clip 34 selectively engages both the first knob 28 and the second knob 32 wherein the clip 34 inhibits twisting of the tray 12 relative to the sheet 38 when the clip 34 is engaged to the first knob 28 and the second knob 32. The clip 34 may have a rounded end 40 and a pair of arcuate sections 42 forming a neck 44 in spaced relationship to the rounded end 40 to receive the first knob 28 and the second knob 32 in the clip 34 between the rounded end 40 and the arcuate sections 42.

A hook 46 may be coupled to the perimeter wall 16 of the tray 12. The hook 46 has a distal section 48 relative to the tray 12, a proximal section 50 relative to the tray 12, and a medial section 52 extending between the proximal section 50 and the distal section 48. The distal section 48 may extend from the medial section 52 towards the perimeter wall 16 defining a barb 54 wherein the distal section 48 is configured for retaining a cord 56 in the hook 46 between the medial section 52 and the perimeter wall 16. The medial section 52 may be convexly arcuate relative to an upper edge 58 of the perimeter wall 16. The hook 46 may be centrally positioned on an associated one of the end sides 26 of the perimeter wall 16.

A plurality of feet 60 may be coupled to and extend from the bottom surface 30 of the panel 14. The feet 60 may be constructed of rubber or the like. The feet may extend farther from the panel 14 than the first knob 28 and the second knob 32 such that the tray 12 is selectively positionable to be supported by the feet 60 on a planar surface such as a night stand.

A platform 62 is planar and coupled to the tray 12. The platform 62 is positioned in the receptacle 20. The platform 62 is pivotable adjacent to an associated side 64 of the tray 12. The associated side 64 of the tray 12 may be either one of the longitudinal sides 24 or one of the opposed end sides 26. Thus, the platform 62 is configured to support the phone 22 in a pivoted position relative to the tray 12 enhancing visibility of a display screen 66 of the phone 22 while the phone 22 is supported by the platform 62. A medial support 68 may be coupled the tray 12 and positioned in the receptacle 20 between the panel 14 and the platform 62. The medial support 68 abuts a lower surface 70 of the platform 62 when the platform 62 is in a parallel position relative to the panel 14. The platform 62 may be retained in a desired orientation or angle relative to the panel 14 by friction or another conventional manner of securement to hold the platform in the desired position while supporting the phone 22.

In use, the device 10 holds the phone 22 in a secure position relative to the sheet 38 allowing a person to set the phone 22 adjacent to the person as they lie on the sheet 38. The tray 12 prevents the phone 22 from slipping off the sheet 38 while a person sleeps. Alternatively, the tray 12 may be positioned on a nightstand or the like with the tray 12 being supported on the feet 60.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. A phone support device comprising:
a tray having a panel and a perimeter wall coupled to and extending upwardly from a perimeter edge of said panel defining a receptacle such that said tray is configured for receiving a phone in said tray;
a knob coupled to and extending from a bottom surface of said panel; and
a clip having a pair of spaced arms, said spaced arms being selectively engageable to said knob wherein said clip is configured for securing said tray to a sheet by positioning the sheet between said knob and said clip when said clip is engaged to said knob; and
a platform being planar and coupled to said tray, said platform being positioned in said receptacle, said platform being pivotable adjacent to an associated side of said tray wherein said platform is configured to support a phone in a pivoted position relative to said tray enhancing visibility of a display screen of the phone while the phone is supported by the platform.

2. The device of claim 1, further comprising:
said knob being a first knob;
a second knob coupled to and extending from said bottom surface of said panel, said second knob being positioned in spaced relationship to said first knob; and
said clip being elongated, said clip selectively engaging both said first knob and said second knob wherein said clip is configured for inhibiting twisting of said tray relative to the sheet when the clip is engaged to said first knob and said second knob.

3. The device of claim 1, further comprising a hook coupled to said perimeter wall of said tray, said hook having a distal section relative to said tray, a proximal section relative to said tray, and a medial section extending between said proximal section and said distal section.

4. The device of claim 1, further comprising a plurality of feet coupled to and extending from said bottom surface of said panel.

5. The device of claim 1, further comprising a medial support coupled said tray and positioned in said receptacle between said panel and said platform, said medial support abutting a lower surface of said platform when said platform is in a parallel position relative to said panel.

6. The device of claim 2, further comprising:
said perimeter wall having a pair of longitudinal sides and a pair or opposed end sides extending between said longitudinal sides;
a hook coupled to said perimeter wall of said tray, said hook having a distal section relative to said tray, a proximal section relative to said tray, and a medial section extending between said proximal section and said distal section, said distal section extending from said medial section towards said perimeter wall defining a barb wherein said distal section is configured for retaining a cord in said hook between said medial section and said perimeter wall, said medial section being convexly arcuate relative to an upper edge of said perimeter wall, said hook being centrally positioned on an associated one of said end sides of said perimeter wall;
a plurality of feet coupled to and extending from said bottom surface of said panel; and
a medial support coupled said tray and positioned in said receptacle between said panel and said platform, said medial support abutting a lower surface of said platform when said platform is in a parallel position relative to said panel.

7. A phone support device comprising:
a tray having a panel and a perimeter wall coupled to and extending upwardly from a perimeter edge of said panel defining a receptacle such that said tray is configured for receiving a phone in said tray;
a knob coupled to and extending from a bottom surface of said panel; and
a clip having a pair of spaced arms, said spaced arms being selectively engageable to said knob wherein said clip is configured for securing said tray to a sheet by positioning the sheet between said knob and said clip when said clip is engaged to said knob;
a hook coupled to said perimeter wall of said tray, said hook having a distal section relative to said tray, a proximal section relative to said tray, and a medial section extending between said proximal section and said distal section, said distal section extending from said medial section towards said perimeter wall defining a barb wherein said distal section is configured for retaining a cord in said hook between said medial section and said perimeter wall.

8. The device of claim 7, further comprising said perimeter wall having a pair of longitudinal sides and a pair or opposed end sides extending between said longitudinal sides, said hook being centrally positioned on an associated one of said end sides of said perimeter wall.

9. A phone support device comprising:
a tray having a panel and a perimeter wall coupled to and extending upwardly from a perimeter edge of said panel defining a receptacle such that said tray is configured for receiving a phone in said tray;
a knob coupled to and extending from a bottom surface of said panel; and
a clip having a pair of spaced arms, said spaced arms being selectively engageable to said knob wherein said clip is configured for securing said tray to a sheet by positioning the sheet between said knob and said clip when said clip is engaged to said knob;
a hook coupled to said perimeter wall of said tray, said hook having a distal section relative to said tray, a proximal section relative to said tray, and a medial section extending between said proximal section and said distal section, said medial section being convexly arcuate relative to an upper edge of said perimeter wall.

* * * * *